United States Patent Office 3,752,884
Patented Aug. 14, 1973

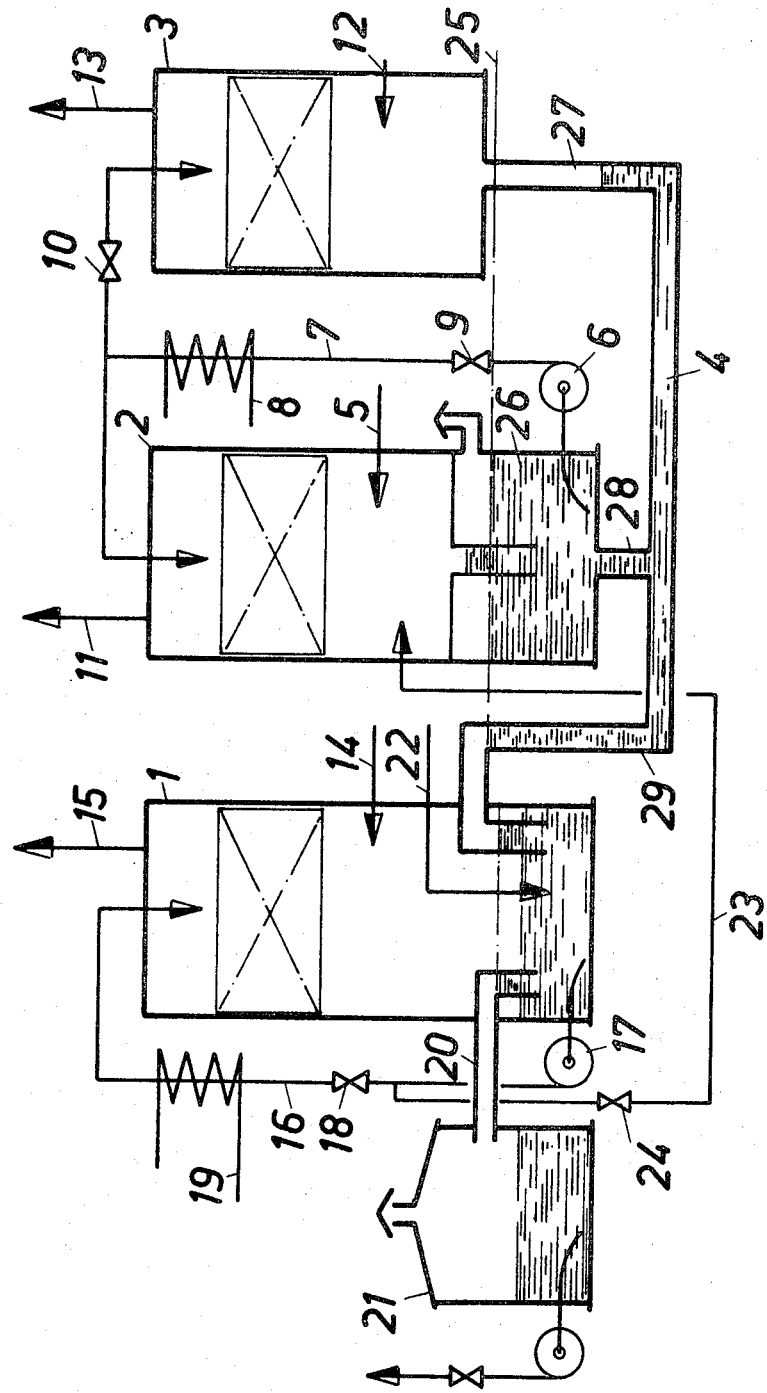

3,752,884
GAS DRYING AND SO₃-ABSORPTION FOR SULFURIC ACID PRODUCTION
Joachim Sasse, Junkersdorf, Germany, assignor to Chemiebau, Dr. A. Zieren GmbH & Co. KG, Cologne, Germany
Filed Oct. 28, 1970, Ser. No. 84,777
Claims priority, application Germany, Oct. 28, 1969, P 19 54 098.8
Int. Cl. C01b 17/72
U.S. Cl. 423—522
11 Claims

ABSTRACT OF THE DISCLOSURE

In the production of sulfuric acid by the contact process comprising the preliminary steps of (a) drying $SO_2$-containing gas in an $SO_2$-drying tower with a concentrated sulfuric acid, the volume of said acid increasing thereby;
(b) drying air in an air-drying tower with a concentrated sulfuric acid; and
(c) the post catalytic reaction step of absorbing resultant sulfur trioxide with a concentrated sulfuric acid in a scrubbing tower;

the improvement comprising establishing fluid communication between the sumps of all of said towers which interconnects the inlet of the $SO_3$-absorption tower, the outlet of the $SO_2$-drying tower and the outlet of the air drying tower with one another. An acid level is obtained in the drying towers and in the $SO_3$-absorption tower sumps which is dependent on the gas pressure in each respective tower.

BACKGROUND OF THE INVENTION

This invention relates to the contact process for the production of sulfuric acid and in particular to an improved system combining $SO_3$-absorption, $SO_2$-drying, and air-drying wherein the several gaseous streams are brought into contact with sufuric acid.

In modern plants utilizing the contact process for the production of sulfuric acid, there are several gaseous process streams which are scrubbed with concentrated sulfuric acid in order to remove water vapor or sulfur trioxide. For example, in a system wherein $SO_2$-containing gas is produced by the burning of pyrite and is thereafter purified, this gas is dried, prior to entering the catalytic reactor, with concentrated sulfuric acid. Also, it is necessary to dry air for various purposes, for example, before it is introduced as a reactant into the catalytic reactor

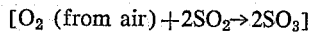

Such gas-drying processes are generally conducted in a packed drying tower countercurrently through downwardly trickling concentrated sulfuric acid; however, other conventional drying towers using sprays or the like can also be employed. In order to remove the sulfur trioxide from the gases formed in the catalytic reactor, these gases are likewise scrubbed with concentrated (about 98%) sulfuric acid, during which procedure the sulfur trioxide is absorbed by the sulfuric acid. In the modern double-absorption processes, two such absorption towers are provided for each catalytic reactor contact unit.

It has been conventional heretofore to operate these towers in an interrelated manner, so that the acid produced in one of the towers is employed for charging another tower. For example, in a plant with drying towers for $SO_2$-gas and air, and with an $SO_3$-absorption tower, it is old to utilize the acid obtained in the drying towers for the $SO_3$-absorption. In order to provide reliability in this process, all towers are provided with a liquid level control and an alarm system. Moreover, the sulfuric acid concentration in the towers must likewise be monitored, so that the acid transfer between the towers can be correctly adjusted. In addition to the considerable investment required for instrumentation and control devices for this purpose, it is also necessary to have capable instrument repairmen and spare parts readily available.

SUMMARY OF THE INVENTION

Relative to the above-described state of the art, it is a principal object of the present invention to simplify the operation, particularly the monitoring of drying and absorption towers in sulfuric acid plants, and to provide a novel process and novel apparatus for this purpose.

Another object is to permit a lower initial investment cost for this part of the plant.

A still further object is to upgrade the safety of the operation.

Upon further study of the specification and appended claims, other objects and advantages of the present invention will become apparent.

To achieve the above objects, a system is provided wherein the outlet of an air-drying tower, the outlet of a tower for the drying of $SO_2$-containing gases, and the inlet of a tower for the $SO_3$-absorption are connected so that they are in communication with one another. By virtue of this communicating conduit, an acid level is obtained in the drying towers and in the inlet of the absorption tower which is dependent on the gas pressure in each respective tower. The amount of the collected acid present in the lower section of the drying towers is furthermore dependent on the height of this lower section below the dormant level at normal pressure when the plant is idle. This automatic adjustment of the sulfuric acid level, because of the fluid communication between the towers, permits the elimination of special devices for level control and associated alarm systems. Another advantage arising from the liquid communication between the towers resides in the compensation of the various increased acid volumes obtained because of the gas absorption in the individual towers. The sulfuric acid levels in the plant thereby becomes more insensitive to external pressure conditions.

Suitably, both drying towers are fed with acid from an acid resorvoir (surge or storage tank) connected to one of the drying towers. Preferably, both drying towers are supplied with acid by the same circulation system, and the $SO_3$-absorption tower is charged with acid by means of a separate circulation system. In this connection, the pump of the $SO_3$-absorption circulating system also is preferably employed to return a portion of the acid from the absorption tower into the $SO_2$-gas drying tower. Whereas a continuous concentration of the acid occurs in the absorption tower by absorption of $SO_3$ from the gaseous phase, the acid is continuously diluted in the drying towers by the absorption of water vapor from both the $SO_2$-containing gas and the air. In order to keep these changes in concentration within certain limits, the more concentrated acid is continuously pumped back from the absorption tower into the $SO_2$-gas drying tower, while at the same time, more diluted acid flows from the air drying tower through the communicating conduit to the absorption tower.

Preferably, the absorption tower is connected, by way of an overflow conduit, with an overflow tank provided with a pump for the product acid, which tank is under normal pressure. The diluted acid having a concentration of $H_2SO_4$ of 95 to 98% by weight, collecting in the conduit connecting the sumps of the drying towers automatically flows, in correspondence with the production rate, into the sump of the $SO_3$-absorption tower. There the diluted acid is mixed with more concentrated acid (98 to 99% $H_2SO_4$) resulting from $SO_3$ absorption, and additional water, if necessary, to provide an acid concentration in the absorption column sump of about 98 to 99%

H₂SO₄. The acid volume present in the towers remains constant by virtue of the overflow conduit which delivers sump acid to the overflow tank. Accordingly, it is no longer necessary to control the amount of overflow in dependence on the production rate.

In accordance with the preferred embodiment of the invention, the provision is made that the acid volume returned from the $SO_3$-absorption tower to the $SO_2$-gas drying tower and the increase in the acid volume incurred in the $SO_2$-gas drying tower by water absorption from the gas are, together, equal to or smaller than the acid volume introduced into the air-drying tower. By this mode of operation, the $SO_2$-containing acid in the sump of the $SO_2$-gas drying tower is safely prevented from being discharged via the sump communicating conduit to the absorption tower. The acid charge to the air-drying tower then is so large that only the $SO_2$-free acid withdrawn from this drying tower flows to the absorption tower, so that the acid transferred from this tower into the product overflow tank is likewise free of $SO_2$.

The $SO_2$-gas drying tower and the $SO_3$-absorption tower are preferably dimensioned to provide a sufficient volume in the lower section so that this lower section can function as a surge tank for maintaining a sufficient inlet head to associated sump pumps, even at the highest gas pressures occurring in the towers. In this case, special pump feed tanks disposed separately from the towers can be omitted.

The gas pressure in each of the three towers varies as a function of the throughput capacity of gas and the momentary flow resistances of the apparatuses.

In any case, the general and preferred ranges of super- or sub-atmospheric pressure in mm. $H_2O$ as set forth below are usually employed:

|  | General | Preferred |
| --- | --- | --- |
| Air-drying tower | +500 to +3,000 | +1,500 to +2,500 |
| $SO_2$-drying tower | −100 to −500 | −200 to −400 |
| $SO_3$-absorption tower | −20 to +300 | +20 to +250 |

Furthermore, provision is made that the conduit for returning the acid from the absorption tower to the $SO_2$-gas drying tower is connected to the circulation conduit of the absorption tower upstream of the regulating valve of this conduit, downstream of the pump, and is equipped with a control valve.

The connection of the return line to the circulation line upstream of the valve regulating the circulation ensures that the acid cycle of the absorption tower is only slightly interferred with by the return of the acid to the $SO_2$-gas drying tower. Suitably, a higher amount of concentrated acid is fed to the $SO_2$-gas drying tower by the return line than is required for maintaining the acid concentration constant in the drying towers. For example 10% more acid is returned than used as theoretically calculated. In this way, it is possible to eliminate a control apparatus.

BRIEF DESCRIPTION OF THE DRAWING

The attached drawing is a schematic flowsheet, showing the operation of an $SO_3$-absorption tower, an $SO_2$-gas drying tower, and an air-drying tower in a sulfuric acid contact plant, combined in accordance with the preferred embodiment of this invention.

DETAILED DESCRIPTION OF THE PREFERRED DRAWING

In accordance with the drawing, inlet 29 of an $SO_3$-absorption tower 1, outlet 28 of drying tower 2 for the $SO_2$-containing gas, and outlet 27 of air-drying tower 3 are connected to be in communication with one another by a common pipeline 4. All three towers are part of a conventional cold gas plant for the production of sulfuric acid from roasting gases obtained by the burning of pyrite. Such cold gas plants are known per se and need not be described in detail herein [see B. Waeser, "Die Schwefelsaeurefabrikation" (Sulfuric Acid Production) (1961), pp. 370–371].

The roasting gas purified by a hot gas purifier, cooled, scrubbed and treated in a wet gas purifier, all not shown) enters via conduit 5 into a drying tower 2 provided with acid-resistant packing. There, the gas is dried with essentially concentrated sulfuric acid, e.g. 96% $H_2SO_4$. The roasting gas is evacuated from the $SO_2$-drying tower 2 by means of a blower (not shown) at 11, creating a subatmospheric pressure of about 300 mm. $H_2O$-gauge in the tower. The $SO_2$-drying tower 2 contains, in the lower section, a considerable reservoir 26 of approximately 95% (by weight) sulfuric acid, providing an inlet head for the pump 6. Both drying towers 2, 3 are fed the 95% sulfuric acid by pump 6 via conduit 7 through cooling unit 8. The amounts charged to the two respective towers are controlled by the two valves 9, 10. The roasting gas dried in the drying tower 2 flows from conduit 11 through a series of heat exchangers and from there into the contact unit (not shown).

In the packed air-drying tower 3, air, introduced into the tower through conduit 12, is dried by drops of substantially concentrated sulfuric acid and is then likewise charged into the contact unit via conduit 13. In this air-drying tower, a superatmospheric pressure of, for example 2000 mm. $H_2O$-gauge is present.

The $SO_3$-containing gas formed in the contact unit by conversion is introduced, at 14, into the $SO_3$-absorption tower 1 and, for absorption of the $SO_3$, is treated with trickling concentrated sulfuric acid. The gas space of the tower 1 is under a superatmospheric pressure of about 100 mm. $H_2O$-gauge. The gas freed of $SO_3$ is withdrawn via conduit 15 and after treatment in acid separators is passed into the atmosphere. The absorption tower 1 is provided with packing as well as a sulfuric acid reservoir similar to $SO_2$-drying tower 2. The circulation system of absorption tower 1 consists of the conduit 16, pump 17, control valve 18, and cooling unit 19. The acid reservoir of the tower 1 is connected, via an overflow pipe 20, with an overflow tank 21 which is under normal pressure. To maintain the sulfuric acid concentration in the absorption tower 1, water is fed to this tower via conduit 22. Finally, the circulation conduit 16 between the pump 17 and the control valve 18 is connected with the drying tower 2 via an acid return line 23. A valve 24 in this line 23 makes it possible to regulate the return of the acid in correspondence with the amounts of water absorbed from the gases in towers 2 and 3.

In view of the communication between the outlets 28 and 27 of towers 2 and 3 with each other and with the inlet 29 of the tower 1 according to this invention, taken further with the use of the overflow pipe 20 to the overflow tank 20, there are obtained acid levels corresponding to the various gas pressures in the towers, as shown in the figure. Conversely, the drawing also shows level 25 to which the acid adjusts itself when the plant is shut down, i.e. when the gaseous space in all towers is under normal pressure.

Whereas the acid in reservoir 26 in the tower 2 picks up some $SO_2$, it is then degasified of $SO_2$ upon being recirculated through the air-drying tower 3. To prevent non-degasified acid from passing from tower 2 into the tower 1 and thus causing overflow of non-degasified acid into the overflow tank 21, the operation of the drying towers 2, 3 is controlled by the valves 10 and 24 in such a manner that the amount of acid conducted through valve 10 to the air-drying tower 3 is larger than the sum of the volume of acid returned through conduit 23 into the tower 2 and the increase in liquid volume obtained in tower 2 by water absorption. When this operating condition is observed, it is impossible for any non-degasified acid to flow from the acid reservoir 26 of the tower 2 into the connecting pipeline 4 and then via the inlet 29 into the tower 1. Accordingly, it is thus ensured, in the plant according to this invention, that all of the acid from $SO_2$-drying tower 2 must pass through the air-drying tower 3 before entering the $SO_3$-absorption tower 1, and in this manner tower 3 acts as a $SO_2$-degasifying tower.

The process of this invention is distinguished by a simplified mode of operation, as compared to the towers known heretofore which were operated substantially independently of one another. For example, it is now unnecessary to monitor and maintain predetermined acid levels in the three towers and to monitor and maintain predetermined acid concentrations in the drying towers 2 and 3. Automatic control of these parameters is no longer required. The acid concentration in the $SO_3$-absorption tower 1 is monitored as the only controlling operating condition and this, in turn, controls the feed of water metered through conduit 22.

The safety aspects in the operation of a plant according to this invention are also considerably improved as compared to the state of the art in this field. Even in case of widely varying $H_2O$- and/or $SO_3$-contents of the gases, a safe operation is ensured. The reason for this is that since no level control is required, no tower can overflow or run empty due to faulty control devices or operating errors. The monitoring of the concentration in the drying towers becomes unnecessary, since the difference of the acid concentrations in the absorption tower 1, on the one hand, and the drying towers 2, 3, on the other hand, adjusts itself automatically.

In addition to the obvious saving in operating personnel, less service work is required, as well, in connection with the mechanical, electrical, and control mechanisms of the plant, due to the substantial absence of such control and regulating devices. From the standpoint of plant investment, in the preferred embodiment, the components which can be saved are: two pumps, one lower tower section (air-drying tower), two concentration metering or regulating devices, three level control devices, acid conduits, about 10 valves, and the labor expenditures for installation and construction work connected therewith.

The invention is not limited to the illustrated embodiment; rather, it is useful in all cases wherein a plurality of drying and/or absorption towers are to be operated in a combined arrangement with acids of varying concentration.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In the production of sulfuric acid by the contact process comprising the preliminary steps of
    (a) drying $SO_2$-containing gas in an $SO_2$-drying tower having a sump with a concentrated sulfuric acid, the volume of said acid increasing thereby;
    (b) drying air in an air-drying tower having a sump with a concentrated sulfuric acid; and
    (c) the post catalytic reaction steps of absorbing resultant sulfur trioxide with a concentrated sulfuric acid in an $SO_3$-absorption tower having a sump; the improvement comprising:
    (d) establishing a fluid communication interconnecting all of the sumps of said towers with one another, said fluid communication comprising a common pipeline interconnecting an acid sump inlet between the acid reservoir and packing of said $SO_3$-absorption tower, an acid sump outlet from the acid reservoir of said $SO_2$-drying tower and an acid sump outlet from the acid reservoir of said air drying tower with one another so that an acid level is obtained in the drying towers and in the acid sump inlet of the $SO_3$-absorption tower which is dependent on the gas pressures encountered in each respective tower; and
    (e) continuously passing a concentrated sulfuric acid thru said fluid communication from the said sump outlet of said air drying tower to the acid sump inlet of said $SO_3$-absorption tower.

2. A process as defined in claim 1, further comprising passing concentrated sulfuric acid through a line leading from the sump of said $SO_2$-drying tower into the top of both of said drying towers to absorb water vapor from both the $SO_2$-containing gas and the air in the respective towers.

3. A process as defined by claim 1, further comprising recycling acid from the sump of said through a line leading $SO_3$-absorption tower to the $SO_2$-drying tower at a point above the sump thereof and in direct contact with incoming $SO_2$-containing gas.

4. A process as defined by claim 2, further comprising recycling acid through a line leading from the sump of said $SO_3$-absorption tower to the $SO_2$-drying tower at a point above the sump thereof and in direct contact with incoming $SO_2$-containing gas.

5. A process as defined by claim 1, further comprising passing concentrated sulfuric acid through a line leading $SO_3$-absorption from the sump of said tower to the top of said tower.

6. A process as defined by claim 4, wherein the total volume of recycled concentrated acid plus the increase in volume of the acid obtained in the $SO_2$-gas drying tower amounts to not more than the volume of acid charged to the air-drying tower.

7. A process as defined by claim 1, further comprising delivering wherein excess sump acid in said $SO_3$-absorption tower to an overflow tank by means of an overflow conduit.

8. A process as defined by claim 1 further comprising feeding water into said $SO_3$ absorption tower to maintain the sulfuric acid concentration therein.

9. A process as defined by claim 8 further comprising regulating acid return corresponding to the amounts of water absorbed from the gases in the $SO_2$ drying tower and in the air drying tower by an acid return line interconnecting said $SO_3$-absorption tower and said $SO_2$-drying tower.

10. A process as defined by claim 1 wherein the total volume of recycled concentrated acid plus the increase in volume of the acid obtained in the $SO_2$-gas drying tower amounts to not more than the volume of acid charged to the air-drying tower.

11. A process as defined by claim 2 further comprising charging said air-drying tower with acid from said $SO_2$-drying tower in an amount larger in volume than the sum of the volume of said charged to said $SO_2$-drying tower plus the increase in liquid volume obtained therein by water absorption, whereby all of the acid from said $SO_2$-drying tower must pass thru said air-drying tower before entering said $SO_3$-absorption tower.

References Cited
UNITED STATES PATENTS

| | | | |
|---|---|---|---|
| 2,466,767 | 4/1949 | Herrmann et al. | 23—167 |
| 2,819,947 | 1/1958 | Stahl | 23—167 |
| 3,525,586 | 8/1970 | Dreschsel et al. | 23—168 |
| 3,532,471 | 10/1970 | Wiklund | 23—168 X |

OSCAR R. VERTIZ, Primary Examiner

C. B. RODMAN, Assistant Examiner